(12) United States Patent
Ivanov et al.

(10) Patent No.: US 8,924,988 B2
(45) Date of Patent: *Dec. 30, 2014

(54) COLLOCATION IN A JAVA VIRTUAL MACHINE OF JSLEE AND JAVA EE

(75) Inventors: Ivelin Atanasoff Ivanov, Austin, TX (US); Eduardo Martins, Sesimbra (PT); Bartosz Jan Baranowski, Warsaw (PL)

(73) Assignee: Red Hat, Inc., Raleigh, NC (US)

( * ) Notice: Subject to any disclaimer, the term of this patent is extended or adjusted under 35 U.S.C. 154(b) by 1226 days.

This patent is subject to a terminal disclaimer.

(21) Appl. No.: 12/156,329

(22) Filed: May 30, 2008

(65) Prior Publication Data

US 2009/0300662 A1    Dec. 3, 2009

(51) Int. Cl.
G06F 3/00 (2006.01)
G06F 9/54 (2006.01)

(52) U.S. Cl.
CPC .................................. G06F 9/541 (2013.01)
USPC ........................................................ 719/328

(58) Field of Classification Search
None
See application file for complete search history.

(56) References Cited

U.S. PATENT DOCUMENTS

2002/0194397 A1* 12/2002 Creamer et al. ............... 709/328

OTHER PUBLICATIONS

JAIN SLEE Tutorial by Lim et al. 2003, 41 pages.*
A SLEE for all Seasons by Open Cloud. May 11, 2007, 12 pages.*
JAIN SLEE 1.0 Specification, Final Release, Lim et al. 2002, 284 pages.*
The JBOSS JMX Microkernel, Chapter 2, Oct. 19, 2005, 90 pages.*
Sun Microsystems, "JAIN Technology: Serving the Developer Community", <http://java.sun.com/products/jain/jain0503.pdf>, Aug. 26, 2003, 69 pages.*
Ferry, David. "JAIN SLEE 1.1 Specification, Public Review Draft", 2006. Sun Microsystems, 522 pages.*
"Google Code: Mobicents", http://code.google.com/p/mobicents/source/browse/tags/B1.2.02-.libraries_remove/examples/3pcc, 1 page, Sep. 8, 2008.
"Google Groups", http://groups.google.com, 1 page, Sep. 8, 2008.
"Google: MobiCents", http://code.google.com/p/mobicents/w/list, 1 page, May 8, 2008.
"java.net: Mobicents Frequently Asked Questions", http://wiki.java.net/bin/view/Communications/MobicentsFAQ, 1-4 pages, Mar. 14, 2006.
"JBoss Communications Platform", *Red Hat*, (Sep. 2007), 1-39 pgs.
"JBoss.org Community Documentation", http://groups.google.com/group/mobicents-public/web/chapter-introduction.html, 2-3 pages, Sep. 8, 2008.
"JBoss.org Community Documentation", http://groups.google.com/group/mobicents-public/web/chapter-introduction.html, page 2, 2008.
"MobiCents", http://www.mobicents.org-a.googlepages.com/products.html, 1-2 pages, 2006.
"MobiCents—Public: Converged Application Demo", http://groups.google.com/group/mobicents-public/web/converged-application-demo, 3 pages, 2008.

(Continued)

*Primary Examiner* — H S Sough
*Assistant Examiner* — Carina Yun
(74) *Attorney, Agent, or Firm* — Lowenstein Sandler LLP (57) ABSTRACT

In one embodiment, a mechanism for collocation in a JAVA Virtual Machine of Java™ APIs for Intelligent Networks Service Logic Execution Environment (JSLEE) and Java™ Enterprise Edition (J2EE) is disclosed. In one embodiment, a system includes an integrated application server including JSLEE and J2EE, one or more resource adapters communicably coupled to the integrated application server, and one or more management interfaces communicably coupled to the integrated application server.

15 Claims, 9 Drawing Sheets

(56) References Cited

OTHER PUBLICATIONS

"MobiCents: Google Code", http://code.google.com/p/mobicents/, 1-2 pages, Sep. 8, 2008.
"MobiCents: Installation Instructions from the binary", http://www.mobicents.org-a.googlepages.com/installation.html, (2006), 1-2 pages.
"MobiCents: Installation Instructions from the source", http://www.mobicents.org-a.googlepages.com/installation-jboss.html, 1-2 pages, 2006.
"MobiCents: JAIN SLEE (Service Level Execution Environment)", 2006, http://www.mobicents.org-a.googlepages.com/products_jain_slee.html, 1-2 pages.
"MobiCents: JAIN-SLEE/Sip servlets Interperability Demo", http://www.mobicents.org-a.googlepages.com/jslee-sips-interop-demo.html., (2006), 1-2 pages.
"Mobicents: JSLEEE for the People, by the People", http://today.java.net/lpt/a/273, 1-4 pages, Mar. 14, 2006.
"MobiCents: Red Hat launches JBoss Communications Platform", http://www.mobicents.org/index.html, 1 page, 2007.
"MobiCents: Sip Servlets", http://www.mobicents.org-a.googlepages.com/products_sip_servlets.html, 1-2 pages, 2006.
Ivanov, Ivelin, "Mobicents: JSLEE for the People, by the People", *Mobicents*, http://today.java.net/pub/a/today/2006/03/09/mobicents-jslee.html. /14. May 14, 2008., (Mar. 14, 2006), 1-4 pgs.
Ivanov, Ivelin, "The First Certified Open Source Implementation of JAIN-SLEE 1.0", Mobicents Java.net Communications Community JavaOne, (2005), 1-22 pgs.
Ivanov, Ivelin, et al., "The Mobicents Open Source SLEE Platform", *MobiCents*, (Fall 2005), 1-52 pgs.
Ranganathan, M., et al., "Implementing JAIN-SLEE on the JBoss AS: The Mobicents Open SLEE Project", *JBoss World*, NIST Advanced Networking Technologies Dvision University of Genoa, (2005), 1-47 pgs.
Wunderlich, Thomas, et al., "Red Hat France Telecom RFI: Mobicents", *Red Hat*, (Mar. 12, 2008), 1-30 pgs.
Red Hat, Inc., Non-Final Office Action for U.S. Appl. No. 12/156,301 mailed on Sep. 28, 2011.
USPTO, Final Office Action for U.S. Appl. No. 12/156,301 mailed on Mar. 14, 2012.
USPTO, Advisory Action for U.S. Appl. No. 12/156,301 mailed on May 17, 2012.
USPTO, Office Action for U.S. Appl. No. 12/156,301 mailed Dec. 20, 2012.
USPTO, Final Office Action for U.S. Appl. No. 12/156,301 mailed Apr. 3, 2013.
USPTO, Advisory Action for U.S. Appl. No. 12/156,301 mailed Jun. 10, 2013.
USPTO, Office Action for U.S. Appl. No. 12/156,301 mailed Jul. 19, 2013.
USPTO, Final Office Action for U.S. Appl. No. 12/156,301 mailed on Dec. 18, 2013.
USPTO, Notice of Allowance for U.S. Appl. No. 12/156,301 mailed Apr. 8, 2014.

\* cited by examiner

COLLOCATION IN A JAVA VIRTUAL MACHINE OF JSLEE AND JAVA EE

TECHNICAL FIELD

The embodiments of the invention relate generally to communication platforms and, more specifically, relate to a mechanism for collocation in a Java™ virtual machine of JSLEE and Java™ EE.

BACKGROUND

Voice over Internet Protocol (VoIP) has seen a rise in popularity in recent times and has become more than just a telephony application. For instance, several highly popular applications have come into existence like Skype™, Google Talk™, and MSN Messenger™. All of these applications combine voice, instant messaging (IM), and other modes of communication into unified clients and greatly enhance the user experience. Previously, these means to communicate were islands—largely isolated from each other. However, engineers visited them and found large areas of community between these different modes of communication, resulting in integrated clients that have changed the way in which communication and business is conducted.

For integrated communication applications, such as those described above, server support needs to be provided. An examination of the structure of such applications indicates that there are two parts to the application: the signaling part and the media part. The signaling part is an event-oriented activity. Network endpoints exchange one-way messages through various servers and signal the establishment of a session. Interesting services can be built by placing fragments of code, or "event handlers," in the signaling path at the server. Furthermore, service providers may speed up their innovation processes and quickly launch new services if they use a standards-based component model and container architecture.

One standards-based application execution framework is JAIN SLEE or JSLEE. JAIN is an acronym for "Java APIs for Intelligent Networks." JAIN aims for an enabling set of Java APIs to develop and deploy service-driven network applications. SLEE is an acronym for "service logic execution environment." Together, JAIN SLEE is an application execution framework analogous to the Java™ Enterprise Edition (J2EE) environment. However, in comparison to J2EE, JSLEE's design principles explicitly aim for a low latency (<100 ms) and high throughput (thousands of events per second) environment optimized for asynchronous event processing, including transaction handling, high reliability, a distributed component model, and a standardized framework. Appropriately, JSLEE was designed for a network signaling environment, which is ideal for a communications platform.

JSLEE addresses unique requirements for performance and availability in communications applications that are not addressed by the execution environment of J2EE. One present issue with JSLEE is that, although it can interface with other application servers, this interfacing does not provide the same level of availability, performance, security and scalability as the J2EE environment does. As a result, a way to integrate the robust component model and scalability characteristics designed for high-volume, low-latency signaling of JSLEE with the established and well-known modular architecture of J2EE in a single Java™ virtual machine would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for collocation in a Java™ virtual machine of JSLEE and J2EE. In one embodiment, a system for collocation in a Java™ virtual machine of JSLEE and J2EE includes an integrated application server including JSLEE and J2EE, one or more resource adapters communicably coupled to the integrated application server, and one or more management interfaces communicably coupled to the integrated application server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
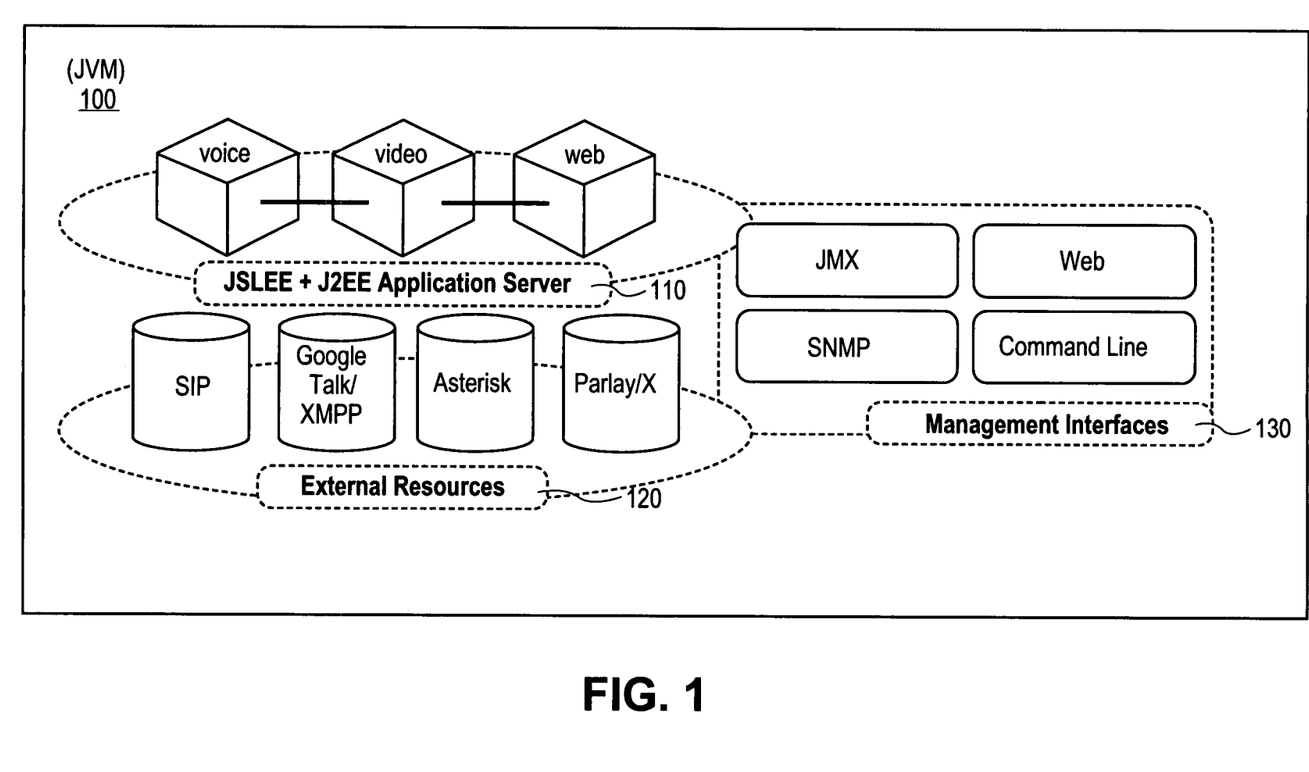
FIG. 1 is a block diagram of a communications platform according to an embodiment of the invention.

Embodiments of the invention provide for collocation in a Java™ virtual machine (JVM) of JSLEE and Java™ EE (J2EE). FIG. 1 is a block diagram of a communications platform 100 according to an embodiment of the invention. In one embodiment, communications platform 100 is a single JVM. A JVM is a set of computer software programs and data structures that use a virtual machine model for the execution of other computer programs and servers. Communications platform 100 enables the creation, deployment, and management of services and applications that integrate voice, video, and data. It also functions seamlessly across a range of Internet Protocol (IP) and communications networks, and can be accessed by computers, handsets, and other network-enabled devices.

Communications platform 100 includes an integrated JSLEE and J2EE application server 110, external resources 120, and management interfaces 130. The integrated JSLEE and J2EE application server 110 combines JSLEE with J2EE to enable the development, deployment and management of applications that integrated of voice, video and data across a range of networks and devices. JSLEE enables web applications to interface with communications networks and devices. JSLEE is the J2EE for communications, as it is event driven, high throughput, and low latency.

The integrated JSLEE and J2EE application server 110 is a single integrated stack, with JSLEE and J2EE running in the same JVM. In one embodiment, this integrated application server 110 provides high availability (HA) features, such as JBoss™ Cache, JGroups™, support for mid-call failover, and support for between-call failover. The integrated application server 110 may also provide high performance characteristics, such as, for example, 250 calls per second on 3 GHz Xeon™ 4GB RAM, or 400 calls per second on 4CPU server. The integrated application server 110 further provides scalability via a flexible architecture for multiple topologies, data center scalability with local network protocol load balancing, and geographic scalability via DNS load balancing. The integrated application server 1 10 of embodiments of the invention additionally provides development benefits, such as not limiting users to an exclusive choice of J2EE OR JSLEE, a continuous step-through debugging experience, a common microkernel architecture (e.g., JBossMX), and shared container building blocks (e.g., Java™ Naming and Directory Interface (JNDI), Java™ Management Extensions (JMX), Java™ Transaction API (JTA), Web Services, Aspect-Oriented Programming (AOP), etc).

In one embodiment, external resources 120 provide a network abstraction layer for the communications platform 100. The network abstraction layer provides connectivity between applications of the communications platform 100 and any network environment, including an IP network or a Legacy network. In this way, application logic is network protocol agnostic so that the application developer is insulated from the underlying network protocol, and thereby simplifies porting between networks. The network abstraction is achieved by the external resources via Resource Adapters (RAs). For example, RAs may include, but are not limited to, Session Initiation Protocol (SIP), Extensivle Messaging and Presence Protocol (XMPP), Google Talk, Asterisk, Parlay, Diameter, Media, Real-Time Transport Protocol (RTP), Short Message Peer-to-Peer Protocol (SMPP), Intelligent Network Application Part (INAP), HyperText Transport Protocol (HTTP), and Production Rules.

In one embodiment, management interfaces 130 provide third party application programming interfaces (APIs). These third party APIs simplify integrating with core business systems. For example, some of the management functions provides by management interfaces 130 may include, but are not limited to, full visibility for monitoring and management via JMX, internal system APIs (Event Router, Activities, Time Facility), RA APIs, and application APIs (service usage, service building blocks usage, event traffic control). Third party APIs also provide Operational/Business Support Systems (OSS/BSS) connectivity. For example, this may include remote J2EE connectivity via a JCA-SleeConnection, ability to expose JSLEE services as Web Services, and AAA RAs (e.g., Diameter Ro and Sh for authentication, authorization, and billing).

Figure 2:
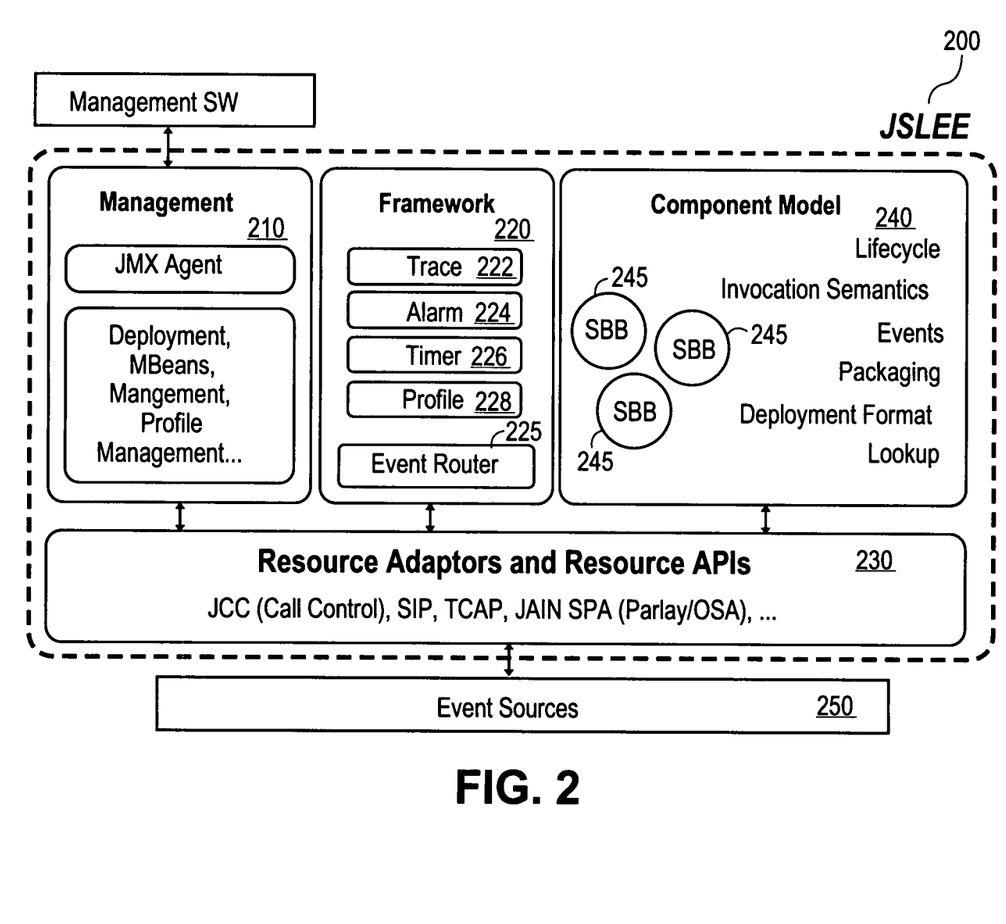
FIG. 2 is a block diagram illustrating a JSLEE architecture according to an embodiment of the invention.

To better understand the JSLEE and J2EE application server 110 component of communications platform 100, a closer look at the building blocks for JSLEE is helpful. FIG. 2 is a block diagram illustrating a JSLEE architecture according to an embodiment of the invention. The JSLEE architecture 200 consists of four main areas: management 210, framework 220, resource adaptors (RAs) 230, and the component model 240.

In one embodiment, the management entities 210 allow the whole JSLEE environment 200 to be managed through Java™ Management Extensions (JMX) MBeans. The various entities in the framework 220 support the business logic implemented in distributed components—the service building blocks (SBBs) 245. Within the framework 220, the trace entity 222 allows a centralized and single point for logging, the alarm entity 224 informs external management systems, the timer entity 226 invokes components in pre-defined intervals, and the profile entity 228 provides the business logic with information and data during execution. The event router 225 of the framework 220 routes incoming and newly created events to previously registered SBBs and resources. The event router 225 is more or less the heart of JSLEE's event routing system.

Resource adaptors 230 bridge the component model 240 and the underlying event infrastructure. An event source 250 from the event infrastructure could be anything emitting events, implemented in any language or environment. The resource adaptor 230 converts incoming protocols and network-specific events into generic, semantically equivalent JAVA events and fires them into the JSLEE application server 200 for further processing. As a result, the application and the source of events 250 are logically decoupled so that applications may execute on any network.

The component model 240 defines how components interact with each other and with the environment, the bundling of services, and their deployment. The JSLEE environment 200 invokes SBBs 245 according to a standardized lifecycle model for SBBs, comparable to an Enterprise JAVA Bean's (EJB's) lifecycle. The runtime environment secures and manages event processing and framework invocation with transactions. Doing so, the JSLEE application server 200 remains in a defined and consistent state even in case of failure.

A service is essentially a management artifact in JSLEE and is bundled as a jar file. A JSLEE container may simultaneously house several services. Each service is a logical grouping of functionality and consists of several SBBs 245. Among them, there is a distinguished SBB called the root SBB (not shown) that is automatically instantiated by the JSLEE container. If appropriate, this root SBB instantiates child SBBs and routes events to these children.

Figure 3:
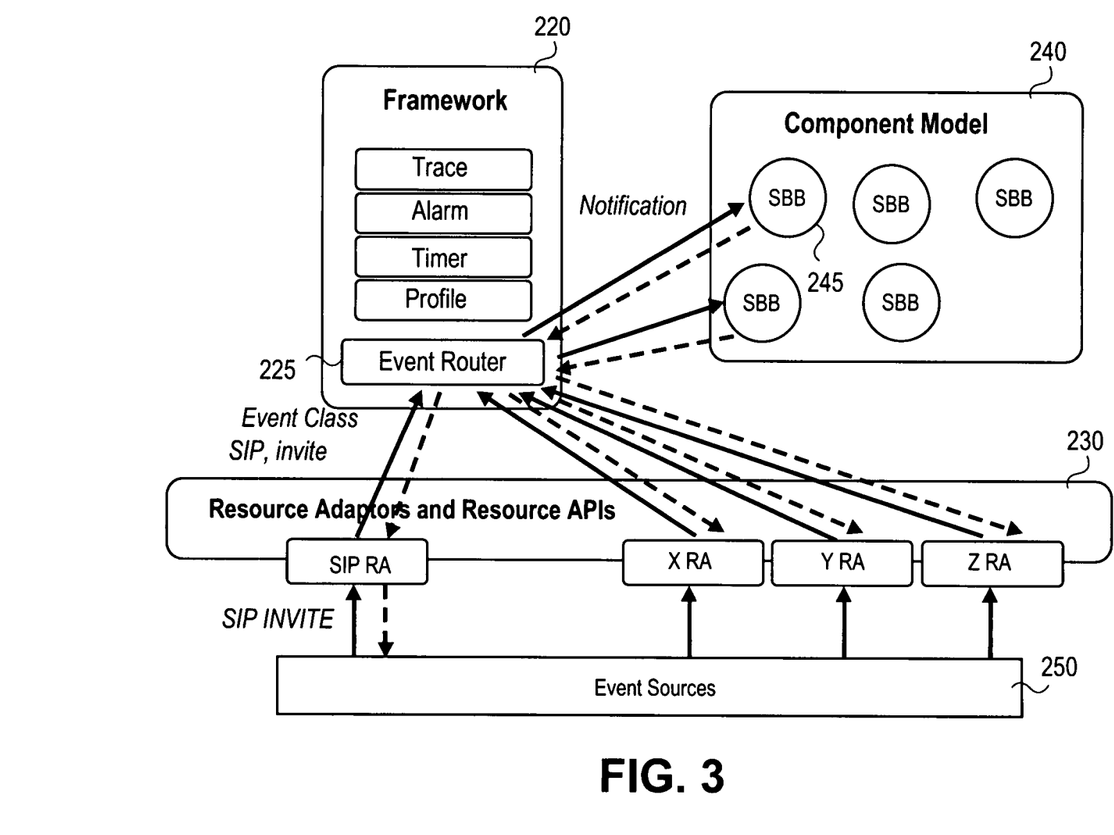
FIG. 3 is a block diagram depicting event processing through resource adaptors and an event router according to an embodiment of the invention.
Figure 4:
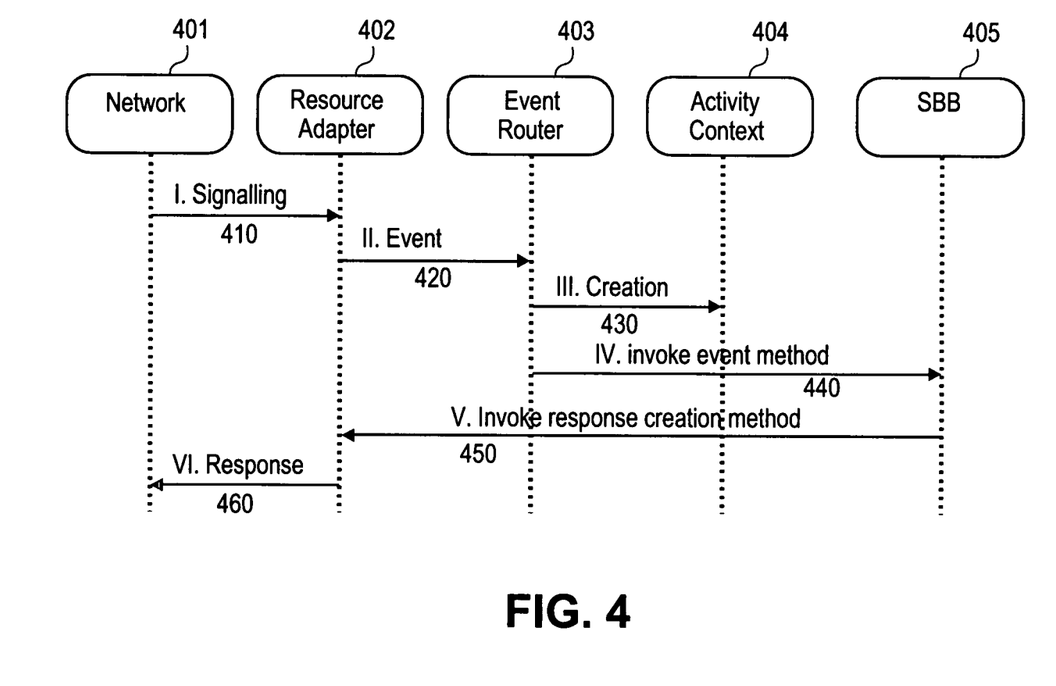
FIG. 4 is a block diagram depicting an example timeline of event processing in a JSLEE environment according to an embodiment of the invention.

FIGS. 3 and 4 depict event processing by the JSLEE environment according to an embodiment of the invention. FIG. 3 is a block diagram depicting event processing through resource adaptors and an event router according to one embodiment. The components illustrated in FIG. 3 are the same as those described with respect to FIG. 2. As such, the same reference numerals described with respect to FIG. 2 will be utilized in FIG. 3 for ease of description.

In one embodiment, incoming events 250 emitted by external sources reach the JSLEE application server 200 through resource adaptors 230, which in turn fire Java™ events towards the event router 225. The event router 225 routes these events to SBBs 245 following predefined prioritizations. Related events are clustered as activities. Events of one activity share a common state: the activity context. For example, one activity may be a phone call with the sequenced events CALL_SETUP, CALL_ESTABLISHED, and CALL_TERMINATED.

Another way to describe the event processing of FIG. 3 follows. In one embodiment, the JSLEE follows a typed event model. Each RA may be thought of as an event source that produces a stream of typed events, and each SBB is an event sink that consumes the stream of typed events. For example, an event, XXX, is consumed by a container invoking a user-written on XXX( ) method with the appropriate signature on the SBB. SBBs may also fire events on activity contexts. In concrete terms, a RA is a wrapper around a protocol stack (e.g., the SIP stack). Its job is to react to incoming messages and generate a typed stream of events that it feeds to the event router. The event router, in turn, starts appropriate transactions, possibly creating root SBBs of service instances and routing events to such SBBs.

Initially, the JSLEE instantiates services in the following manner: (1) An event (for example, an incoming SIP message) arrives on an activity and is fielded by the container via a resource adaptor. (2) The JSLEE container creates an activity context for the activity, if needed. (3) The container searches through the installed services to discover if there is one or more services that are interested in the incoming event.

This works by each active installed service advertising a "convergence name," which is consulted for a match. If a match is found, the container automatically creates the root SBB of the service (if not already instantiated), attaches the root SBB to the activity context, and routes the event to the root SBB via the activity context.

The JSLEE execution model defines transactional boundaries for "SLEE-originated invocation sequences." As in EJB terminology, a transaction is an atomic resilient unit of work. However, unlike EJBs, transaction boundaries are not directly visible. Transactions are started by the system at the beginning of JSLEE-originated sequences, and committed at the end of such sequences. Application errors and exception conditions result in the rollback of the enclosing transaction. Concurrently executing SBBs have a serializable view of the world and are isolated from each other. That is, the final outcome of concurrent execution is some serial ordering of the execution sequences.

The JSLEE does not mandate a specific implementation of the concurrency model. In one embodiment, pessimistic concurrency control may be implemented. In this implementation, a thread pool is used and assigned an executor per activity context. This is a reasonable choice because an activity context is an event bus and events on that bus should be consumed in FIFO order.

The JSLEE derives some of its efficiency by relaxing disk persistence requirements. Very few data structures need to survive a full JSLEE restart. Most sensitive structures can simply be replicated across the cluster rather than persisted to disk. In one embodiment, JBoss™ Cache technology may be used to achieve this. JBoss™ Cache is tightly coupled with the JBoss™ Transaction Manager and provides in-memory replication services across the cluster. Structures in the implementation that need to be replicated by placing them in the cache include activity contexts, SBB entities, and service instances. However, in general, there is no need to replicate the event queue. The final point is a subtle one that works under the assumption that the endpoint will retransmit the message.

FIG. 4 is a block diagram depicting an example timeline of event processing in a JSLEE environment according to an embodiment of the invention. A network-generated 401 signal to set up a telephone call 410 is handed over to a resource adaptor 402. The resource adaptor 402 generates a Java™ event and hands it over 420 to an event router 403. Being the first event in a sequence to set up a call, the event router 403 generates 430 a new activity context 404. This context 404 and the event itself are handed over 440 to the event-processing logic in the SBB 405. After processing the logic, the SBB 405 invokes 450 the resource adaptor 402 and makes it produce an answer 460 for the network 401.

Figure 5:
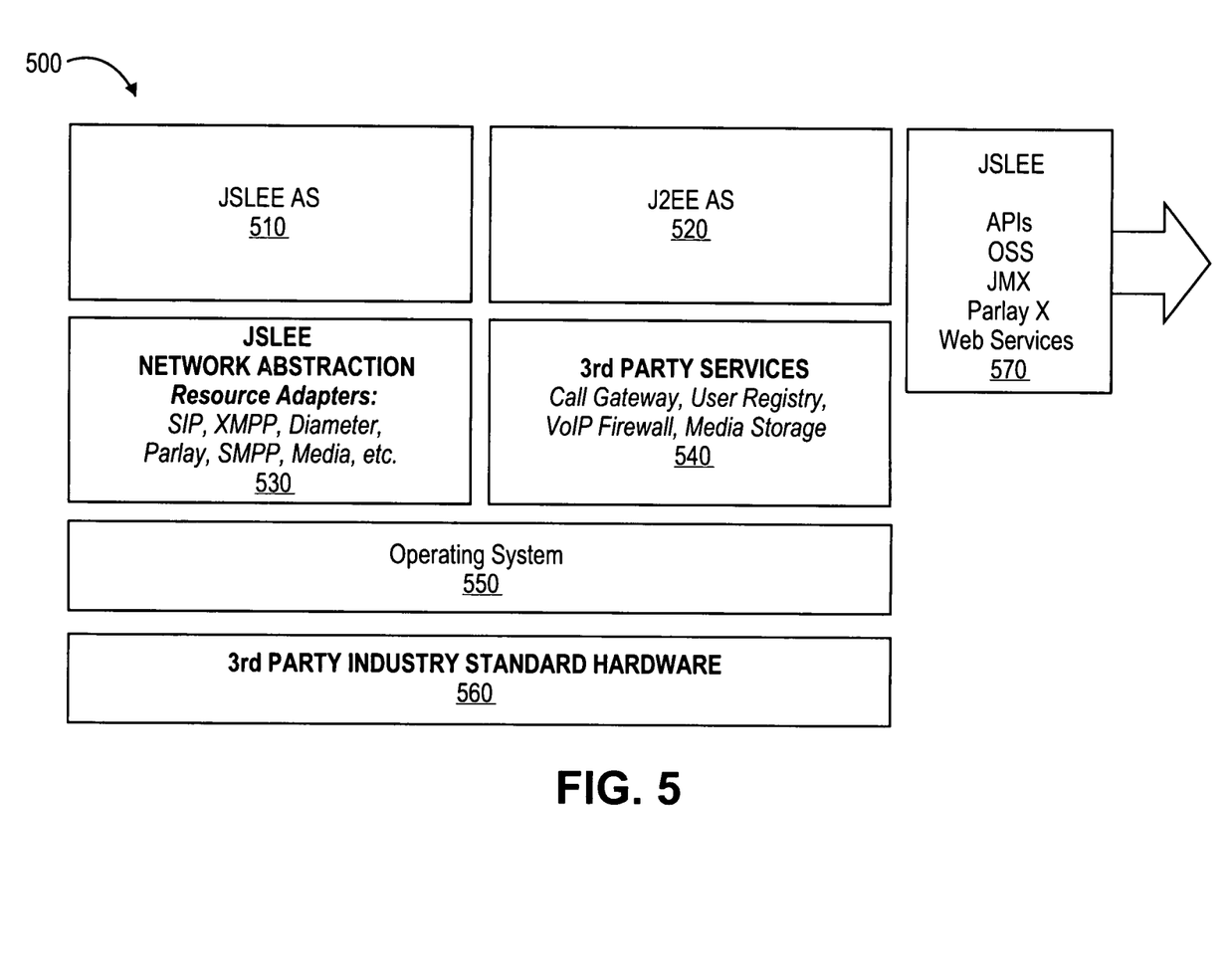
FIG. 5 is a block diagram depicting a communications platform that integrates JSLEE as an extension of J2EE according to an embodiment of the invention.

In light of the above description of the JSLEE environment, the following description provides explanation of integrating this JSLEE environment with J2EE according to embodiments of the invention. FIG. 5 is a block diagram depicting a communications platform 500 that integrates JSLEE as an extension of J2EE according to an embodiment of the invention. As illustrated, the hierarchy of components supporting the integrated JSLEE 510 and J2EE 520 components include a JSLEE network abstraction component 530, third party services 540, an operating system 550, and third party industry standard hardware 560. There are also JSLEE APIs 570 to interface with other outside applications. In one embodiment, the J2EE component 510 may be a JBoss™ application server distributed by Red Hat, Inc. of Raleigh, N.C. In another embodiment, the operating system may be Red Hat™ Enterprise Linux system.

It should be noted that JSLEE is not a J2EE specification. However, it utilizes many J2EE components, like JMX and Transactions. J2EE is an application building platform that provides many facilities that JSLEE uses. For example, some useful J2EE services and tools may include, but are not limited to, JBoss™ cache, JMX, Java™ Naming and Directory Interface (JNDI), JavaAssist™, and JBoss™ clustering.

The use of the modular J2EE architecture with JSLEE results in a simple and cleanly separable architecture for the implementation of embodiments of the invention. Each management interface mandated by the JSLEE is installed as a logically separate microkernel service of the J2EE. The J2EE microkernel architecture allows JSLEE to work with a minimal set of installed J2EE services, thus making for an integrated, extensible, and modular architecture. In particular, embodiments of the invention provide for the integrated JSLEE and J2EE environment with communication between the J2EE components (such as HTTP Servlets and EJBs) and JSLEE components (such as SBBs) via local in-VM passes by reference semantics.

The J2EE microkernel architecture is a natural fit for building that JSLEE. In one embodiment, the JSLEE specification is a service in the JMX microkernel of J2EE. JMX is a Java™ technology that supplies tools for managing and monitoring applications, system objects, devices (e.g., printers), and service-oriented networks. Those resources are represented by objects called MBeans (for Managed Bean). In other embodiments, other similar frameworks may be utilized for the microkernel architecture of J2EE including Open Service Gateway initiative (OSGi), for example.

Figure 6:
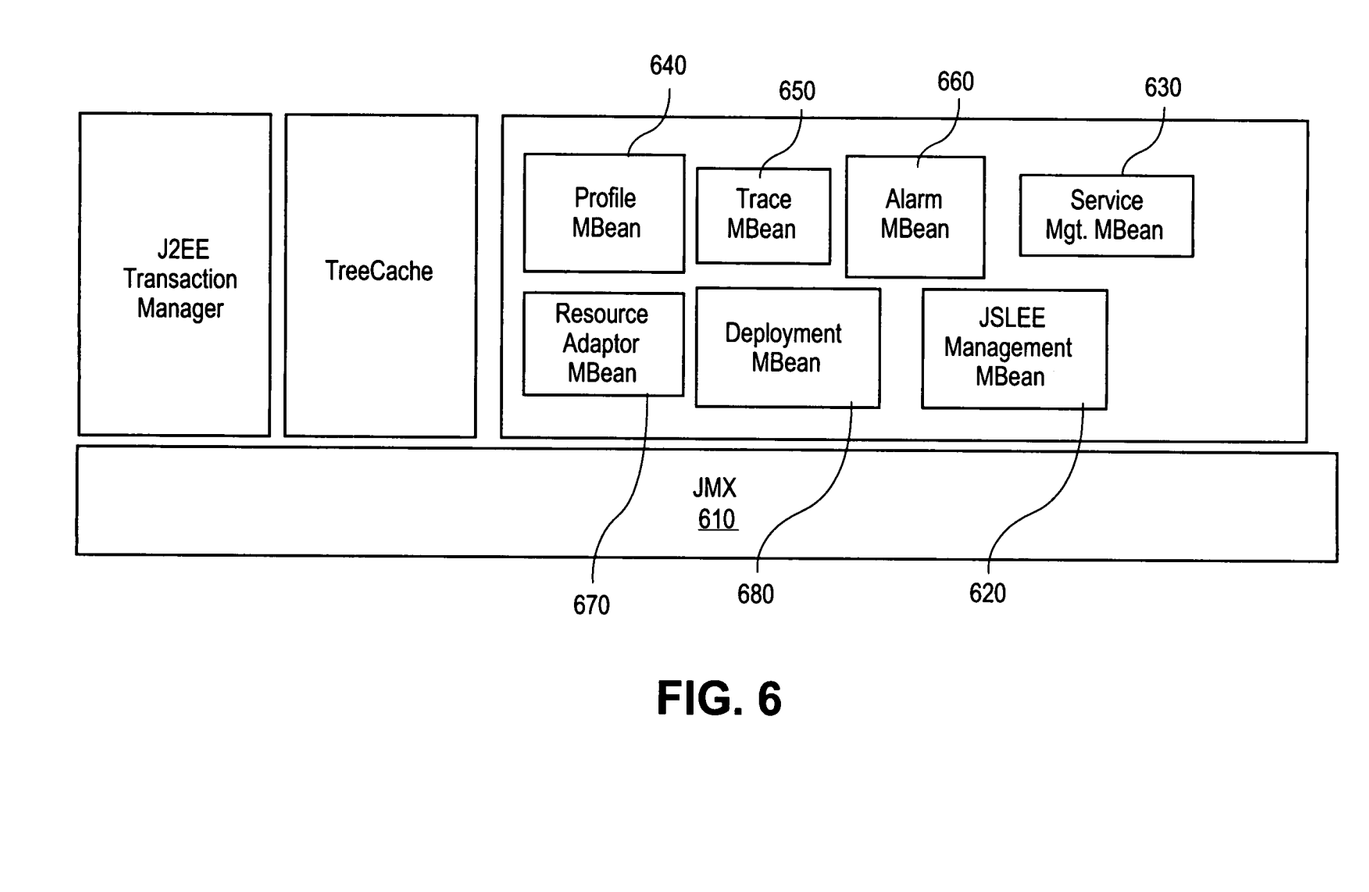
FIG. 6 is a block diagram depicting JSLEE as a J2EE service according to one embodiment of the invention.

FIG. 6 is a block diagram that depicts the JSLEE as a J2EE service according to one embodiment of the invention. As shown in FIG. 6, JSLEE relies on JMX 610 to standardize the management interface. A service is a management artifact in the JSLEE. As such, the JSLEE exports a JSLEE Management MBean 620 and each Service exports a Service Management MBean 630. In addition, each Facility exports an MBean 640-680. The Service Management MBean 630 may be accessed through the JSLEE Management MBean 620 and used to control the service.

Figure 7:
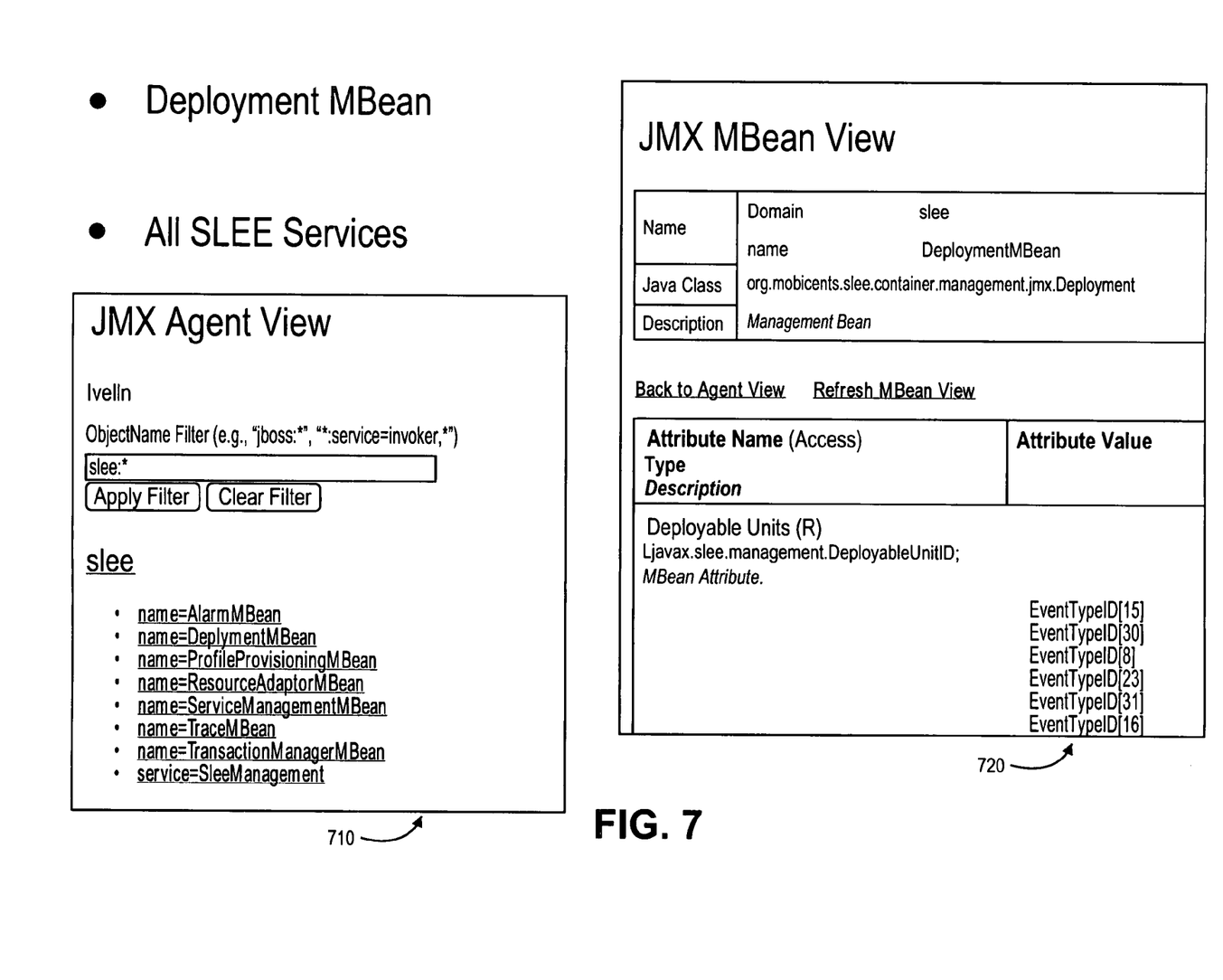
FIG. 7 is a block diagram providing a view of JMX-related details according to an embodiment of the invention.

With regard to the JMX agent 610 of FIG. 6 and its associated MBean objects, FIG. 7 is a block diagram providing a JMX Agent View 710 of all the JSLEE services, and a JMX MBean view 720, according to an embodiment of the invention.

Figure 8:
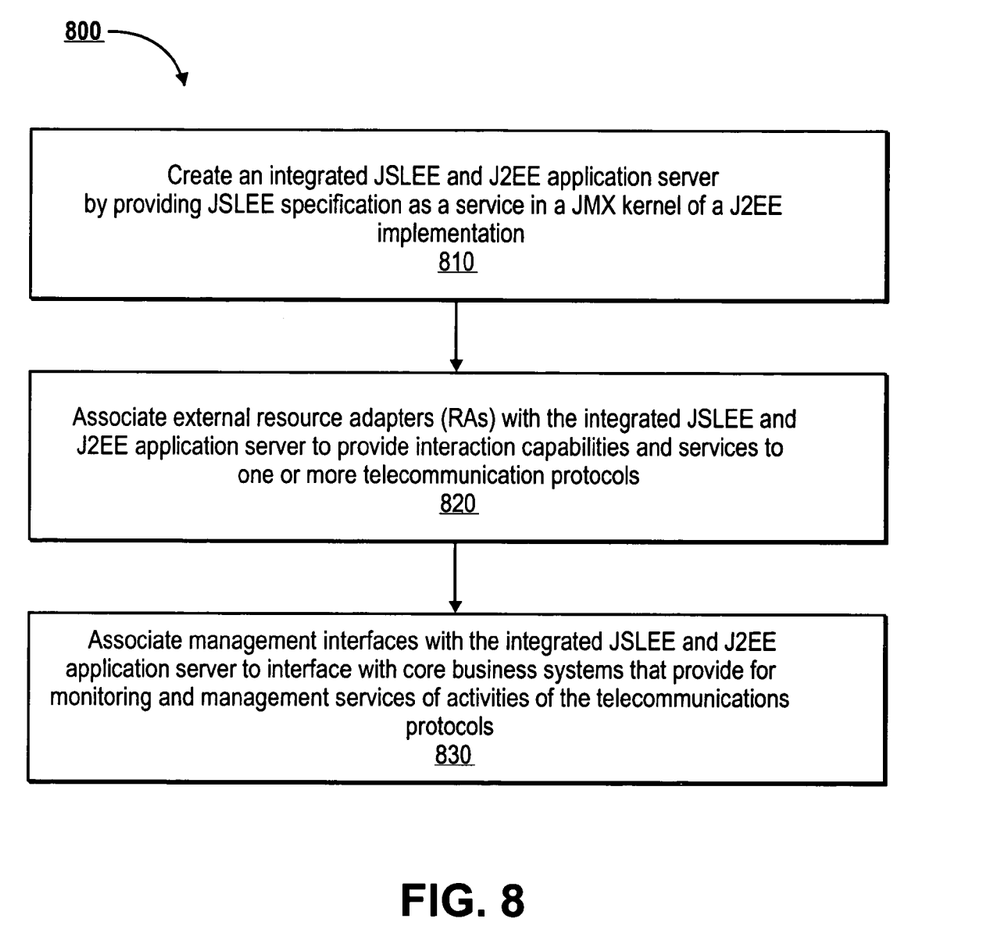
FIG. 8 is a flow diagram illustrating a method for collocating JSLEE and J2EE in a single Java™ virtual machine according to an embodiment of the invention.

FIG. 8 is a flow diagram illustrating a method 800 for collocating JSLEE and J2EE in a single JVM according to an embodiment of the invention. Method 800 may be performed by processing logic that may comprise hardware (e.g., circuitry, dedicated logic, programmable logic, microcode, etc.), software (such as instructions run on a processing device), or a combination thereof. In one embodiment, method 800 may be performed by communications platform 100 described with respect to FIG. 1 or communications platform 500 described with respect to FIG. 5.

Method 800 begins at block 810, where a JSLEE specification is provided as a service in a JMX kernel of a J2EE implementation to create an integrated JSLEE and J2EE application server. Then, at block 820, external RAs are associated with the integrated application server to provide interaction capabilities and services to one or more telecommunications protocols. Lastly, at block 830, management interfaces are associated with the integrated application server to interface with core business systems to provide for monitoring and management services of activities of the telecommunications protocols.

Figure 9:
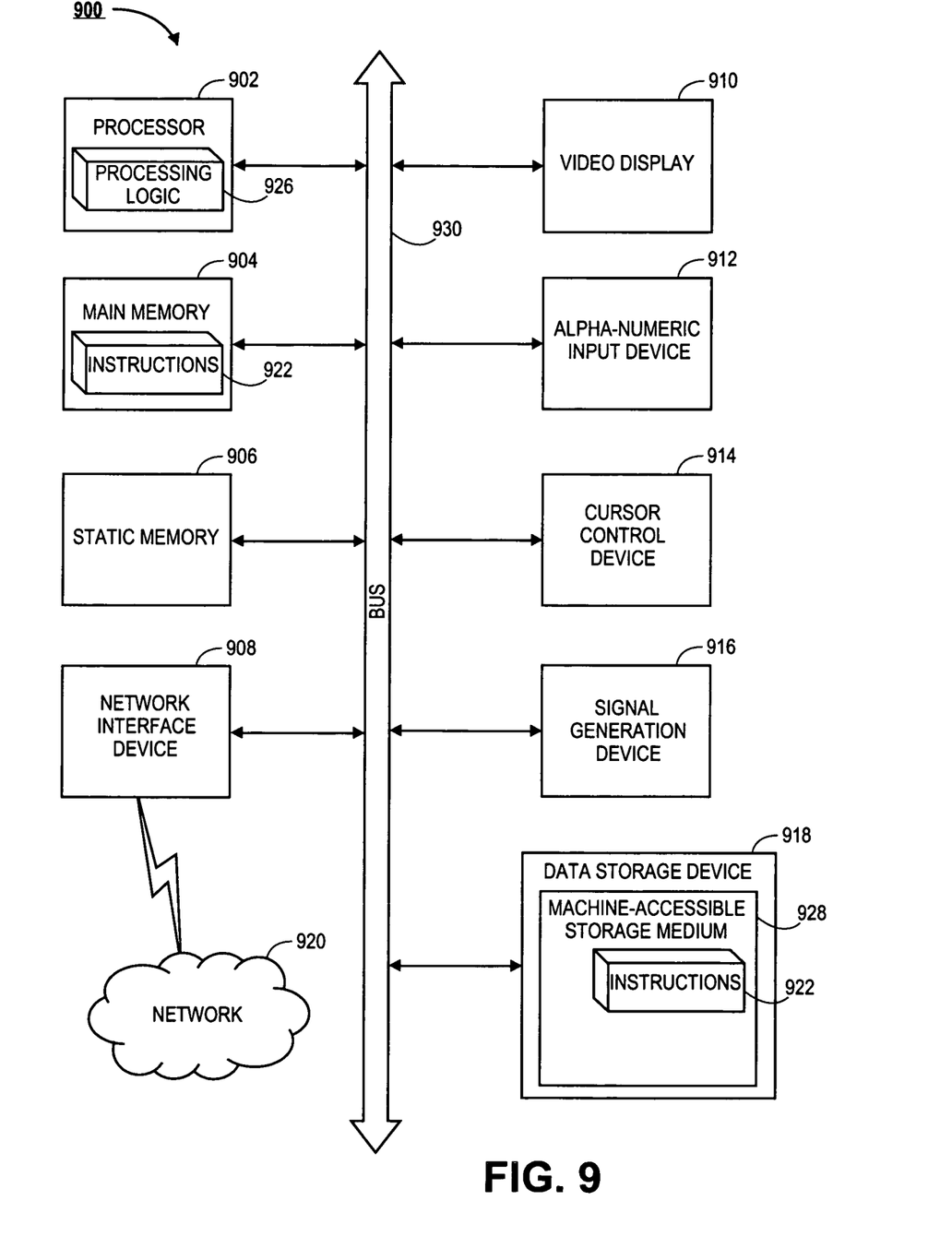
FIG. 9 illustrates a block diagram of one embodiment of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 928 on which is stored one or more set of instructions (e.g., software 922) embodying any one or more of the methodologies of functions described herein. The software 922 may also reside, completely or at least partially, within the main memory 904 and/or within the processing device 902 during execution thereof by the computer system 900; the main memory 904 and the processing device 902 also constituting machine-accessible storage media. The software 922 may further be transmitted or received over a network 920 via the network interface device 908.

The machine-readable storage medium 928 may also be used to implement embodiments of communications platform 100 described with respect to FIG. 1, and/or a software library containing methods that call the above applications. While the machine-accessible storage medium 928 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system, comprising:
    a memory;
    a processing device communicably coupled to the memory;
    an integrated application server executable from the memory by the processing device, the integrated application server comprising:
        a Java™ Application Programming Interfaces (APIs) for Intelligent Networks Service Logic Execution Environment (JSLEE) application server comprising a plurality of management bean (MBean) objects each representing a service provided by the JSLEE application server; and
        a Java™ Enterprise Edition (J2EE) application server to receive the plurality of MBean objects when exported from the JSLEE application server to the J2EE application server;
    wherein the JSLEE application server is provided as a service in a Java™ Management Extensions (JMX) kernel of the J2EE application server by installing the received MBean objects of the JSLEE application server as logically-separate microkernel services of the J2EE application server;
    wherein the JSLEE application server and the J2EE application server are integrated together as a single stack running in a single JAVA virtual machine (JVM) to create the integrated application server that shares a common microkernel architecture comprising the JMX kernel;
    wherein, within the integrated application server, components of the J2EE application server comprising Enterprise Java™ Beans (EJBs) and HyperText Transport Protocol (HTTP) Servlets and components of the JSLEE application server comprising service building blocks (SBBs) communicate with each other via local in-VM passes by reference semantics; and
    wherein the components of the JSLEE application server utilize services and tools provided by the J2EE application server;
    a network abstraction component comprising resource adapters, the network abstraction component executable from the memory by the processing device and communicably coupled to the integrated application server, the resource adapters to provide network connectivity and network abstraction between applications executing on the integrated application server device and any network; and
    management interfaces executable from the memory by the processing device and communicably coupled to the integrated application server, the management interfaces to provide APIs to the integrated application server device for integration with business systems.

2. The system of claim 1, wherein the one or more resource adapters comprise at least one of Session Initiation Protocol (SIP), Extensible Messaging and Presence Protocol (XMPP), GoogleTalk™ voice over Internet Protocol (VoIP) client application, Asterisk™ telephone private branch exchange (PBX) software implementation, Parlay™ API for a telephone network, Real-Time Transport Protocol (RTP), Short Message Peer-to-Peer Protocol (SMPP), Intelligent Network Application Part (INAP), HyperText Transport Protocol (HTTP), or Production Rules.

3. The system of claim 1, wherein the management interfaces comprise at least one of internal system APIs, resource adapter APIs, or application APIs.

4. The system of claim 1, wherein the J2EE application server is an application building platform that provides one or more facilities that the both of the JSLEE application server and the Servlets application server use, the one or more facilities comprising at least one of JBoss™ application server cache, Java™ Management Extensions (JMX) toolkit, Java™ Naming and Directory Interface (JNDI), JavaAssist™ library, or JBoss™ application server clustering service.

5. The system of claim 1, wherein the JSLEE application server exports a JSLEE application server management MBean, each service of the JSLEE application server exports a service management MBean, and each facility exports a facility MBean into the J2EE application server.

6. The system of claim 5, wherein the service management MBean is accessed through the JSLEE management MBean and used to control a service associated with the service management MBean.

7. A method, comprising:
    creating, by a computing device, an integrated application server comprising:
        a Java™ Application Programming Interfaces (APIs) for Intelligent Networks Service Logic Execution Environment (JSLEE) application server comprising a plurality of management bean (MBean) objects each representing a service provided by the JSLEE application server; and
        a Java™ Enterprise Edition (J2EE) application server to receive the plurality of MBean objects when exported from the JSLEE application server to the J2EE application server;
    wherein the JSLEE application server is provided as a service in a Java™ Management Extensions (JMX) kernel of the J2EE application server by installing the received MBean objects of the JSLEE application server as logically-separate microkernel services of the J2EE application server;

wherein the JSLEE application server and the J2EE application server are integrated together as a stack running in a single JAVA virtual machine (JVM) to create the integrated application server that shares a common microkernel architecture comprising the JMX kernel;

wherein, within the integrated application server, components of the J2EE application server comprising Enterprise Java™ Beans (EJBs) and HyperText Transport Protocol (HTTP) Servlets and components of the JSLEE application server comprising service building blocks (SBBs) communicate with each other via local in-VM passes by reference semantics; and wherein the components of the JSLEE application server utilize services and tools provided by the J2EE application server;

associating, by the computing device, a network abstraction component comprising resource adapters with the integrated application server, the network abstraction component to provide network connectivity and network abstraction between applications executing on the integrated application server device and any network; and connecting, by the computing device, management interfaces with the integrated application server, the management interfaces provide APIs to the integrated application server device for integration with business systems.

8. The method of claim 7, wherein associating the one or more resources adapters comprises the one or more resource adapters providing interaction capabilities and services to one or more telecommunications protocols.

9. The method of claim 8, wherein the management interfaces interface with core business systems to provide for monitoring and management services of activities of the telecommunications protocols.

10. The method of claim 7, wherein the one or more resource adapters comprise at least one of Session Initiation Protocol (SIP), Extensible Messaging and Presence Protocol (XMPP), GoogleTalk™ voice over Internet Protocol (VoIP) client application, Asterisk™ telephone private branch exchange (PBX) software implementation, Parlay™ API for a telephone network, Real-Time Transport Protocol (RTP), Short Message Peer-to-Peer Protocol (SMPP), Intelligent Network Application Part (INAP), HyperText Transport Protocol (HTTP), or Production Rules.

11. The method of claim 7, wherein the management interfaces comprise at least one of internal system APIs, resource adapter APIs, or application APIs.

12. The method of claim 7, wherein the creating further comprises providing a specification of the JSLEE application server as a service in a Java™ Management Extension (JMX) kernel of the J2EE application server.

13. A non-transitory machine-readable storage medium including instructions that, when accessed by a processing device, cause the processing device to perform operations comprising:

creating, by the processing device of a computing device, an integrated application server comprising:

a Java™ Application Programming Interfaces (APIs) for Intelligent Networks Service Logic Execution Environment (JSLEE) application server comprising a plurality of management bean (MBean) objects each representing a service provided by the JSLEE application server; and a Java™ Enterprise Edition (J2EE) application server to receive the plurality of MBean objects when exported from the JSLEE application server to the J2EE application server;

wherein the JSLEE application server is provided as a service in a Java™ Management Extensions (JMX) kernel of the J2EE application server by installing the received MBean objects of the JSLEE application server as logically-separate microkernel services of the J2EE application server;

wherein the JSLEE application server and the J2EE application server are integrated together as a stack running in a single JAVA virtual machine (JVM) to create the integrated application server that shares a common microkernel architecture comprising the JMX kernel;

wherein, within the integrated application server, components of the J2EE application server comprising Enterprise Java™ Beans (EJBs) and HyperText Transport Protocol (HTTP) Servlets and components of the JSLEE application server comprising service building blocks (SBBs) communicate with each other via local in-VM passes by reference semantics; and wherein the components of the JSLEE application server utilize services and tools provided by the J2EE application server;

associating, by the computing device, a network abstraction component comprising resource adapters with the integrated application server, the network abstraction component to provide network connectivity and network abstraction between applications executing on the integrated application server device and any network; and connecting, by the computing device, management interfaces with the integrated application server, the management interfaces provide APIs to the integrated application server device for integration with business systems.

14. The non-transitory machine-readable storage medium of claim 13, wherein the creating further comprises providing a specification of the JSLEE application server as a service in a Java™ Management Extension (JMX) kernel of the J2EE application server.

15. The non-transitory machine-readable storage medium of claim 13, wherein associating the one or more resources adapters comprises the one or more resource adapters providing interaction capabilities and services to one or more telecommunications protocols.

* * * * *